(12) United States Patent
Takami et al.

(10) Patent No.: US 8,407,591 B2
(45) Date of Patent: Mar. 26, 2013

(54) IMAGE PROCESSING APPARATUS, COMPUTER PROGRAM PRODUCT, AND PREVIEW IMAGE DISPLAYING METHOD

(75) Inventors: Junichi Takami, Kanagawa (JP); Tetsuya Sakayori, Tokyo (JP); Iwao Saeki, Kanagawa (JP); Yoshifumi Sakuramata, Tokyo (JP); Takashi Yano, Tokyo (JP); Takanori Nagahara, Kanagawa (JP); Hiroko Mano, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 1025 days.

(21) Appl. No.: 12/040,160

(22) Filed: Feb. 29, 2008

(65) Prior Publication Data

US 2008/0218776 A1  Sep. 11, 2008

(30) Foreign Application Priority Data

Mar. 7, 2007  (JP) .................................. 2007-057144

(51) Int. Cl.
*G06F 17/00* (2006.01)
*H04N 1/04* (2006.01)

(52) U.S. Cl. ........ 715/274; 715/204; 715/255; 715/791; 358/1.2; 358/2.1; 358/498

(58) Field of Classification Search .................. 715/200, 715/201, 202, 204, 205, 206, 210, 226, 229, 715/247, 255, 256, 273, 274, 760, 762, 823, 715/825, 203, 234, 243, 253, 254, 700, 791; 358/1.1, 1.2, 1.9, 2.1, 3.01, 3.02, 3.12, 448, 358/498, 505, 528, 537, 538

See application file for complete search history.

(56) References Cited

U.S. PATENT DOCUMENTS

| 5,907,319 | A  | * | 5/1999  | Hashimoto et al. | 345/173  |
|-----------|----|---|---------|------------------|----------|
| 6,927,865 | B1 | * | 8/2005  | Kujirai et al.   | 358/1.12 |
| 6,968,510 | B2 | * | 11/2005 | Yokota           | 715/824  |
| 7,483,166 | B2 | * | 1/2009  | Kadoi et al.     | 358/1.18 |
| 7,809,300 | B2 | * | 10/2010 | Saeki et al.     | 399/82   |
| 7,975,224 | B2 | * | 7/2011  | Paterson et al.  | 715/274  |
| 2002/0105549 | A1 | * | 8/2002 | Yokota         | 345/824  |
| 2004/0207859 | A1 | * | 10/2004 | Kadoi et al.  | 358/1.1  |
| 2006/0221358 | A1 | * | 10/2006 | Takahashi     | 358/1.1  |
| 2006/0238786 | A1 | * | 10/2006 | Sakura et al. | 358/1.9  |
| 2006/0274388 | A1 | * | 12/2006 | Miyazawa et al. | 358/527 |
| 2007/0133073 | A1 | * | 6/2007  | Shida et al.  | 358/527  |
| 2007/0139741 | A1 | * | 6/2007  | Takami et al. | 358/527  |
| 2007/0143671 | A1 | * | 6/2007  | Paterson et al. | 715/527 |
| 2008/0030523 | A1 | * | 2/2008  | Takami et al. | 345/619  |

FOREIGN PATENT DOCUMENTS

| JP | 06-233114  | 8/1994 |
| JP | 09-218617  | 8/1997 |
| JP | 2001-67347 | 3/2001 |
| JP | 2005-012413 | 1/2005 |
| JP | 2006-3568  | 1/2006 |

* cited by examiner

*Primary Examiner* — Maikhanh Nguyen
(74) *Attorney, Agent, or Firm* — Dickstein Shapiro LLP

(57) ABSTRACT

An image processing apparatus includes a preview creating unit, a storage unit, and a display unit. The storage unit stores therein in advance a sample image. The display unit displays, prior to receipt of image data, an input screen that displays the sample image and independent setting items, among a plurality of setting items available for the image data, independent of contents of the image data. The creating unit creates a preview image based on setting specified with respect to any of the independent setting items for the sample image, and the display unit displays the preview image.

20 Claims, 12 Drawing Sheets

FIG. 4

| SETTING ITEM | POSITION (UPPER LEFT AND LOWER RIGHT COORDINATES) |
|---|---|
| STAPLE | (0, 0)  (40, 40) |
| | (120, 0)  (160, 40) |
| PUNCH | (0, 40)  (40, 270) |
| | (40, 0)  (200, 40) |
| MARGIN SHIFT | |

IMAGE PROCESSING APPARATUS, COMPUTER PROGRAM PRODUCT, AND PREVIEW IMAGE DISPLAYING METHOD

CROSS-REFERENCE TO RELATED APPLICATIONS

The present application claims priority to and incorporates by reference the entire contents of Japanese priority document, 2007-057144 filed in Japan on Mar. 7, 2007.

BACKGROUND OF THE INVENTION

1. Field of the Invention

The present invention relates to an image processing apparatus, a computer program product, and a preview image displaying method.

2. Description of the Related Art

In recent years, image forming apparatuses have been widespread in use. Examples of such image forming apparatuses include scanners that scan original images, copiers that print the original images scanned by the scanners, printers and facsimile machines that print image data input from the outside, and multifunction products (MFPs) that have any or all of functions of these.

Such image forming apparatuses provide various functions, and allow a user to specify various settings as to the functions. The settings includes those concerning image processing such as a margin size, and those concerning finishing such as stamping, stapling, and punching.

However, in the conventional image forming apparatuses, when a user sets a finishing function for printing an image, the user cannot check the image in finished state until a print result is output. For example, even if punch holes overlap an image in finished state, it is not until the image is actually printed that the user notices this, which results in a waste of sheets.

For example, Japanese Patent Application Laid-Open No. 2001-67347 discloses a conventional image forming apparatus that can display, prior to printing, a preview image of a finished result obtained by applying image processing with various functions to a pre-scanned original image to allow a user to change print settings when necessary.

However, to receive function settings specified by a user through preview display and print an image after the user checks preview of the image displayed based on the specified settings, the conventional image forming apparatus needs to pre-scan an original to obtain image data prior to printing.

Specifically, when the user desires to use only content-independent functions as to, for example, output color, output density, sheet, enlarge/reduce, simplex/duplex, combination, sort/stack, and background, function settings can be specified without pre-scanning of an original to obtain image data. However, the conventional image forming apparatus is required to scan an original before function settings are specified.

SUMMARY OF THE INVENTION

It is an object of the present invention to at least partially solve the problems in the conventional technology.

According to an aspect of the present invention, there is provided an image processing apparatus including a creating unit that creates a preview image indicating a result of processing image data based on setting specified from a plurality of setting items available for the image data, the setting items including independent setting items independent of content of the image data; a storage unit that stores therein in advance a sample image; and a display unit that displays, prior to receipt of the image data, an input screen that displays the independent setting items and the sample image. The creating unit creates a preview image based on setting specified with respect to any of the independent setting items for the sample image. The display unit displays the preview image.

According to another aspect of the present invention, there is provided a preview image displaying method including creating a preview image indicating a result of processing image data based on setting specified from a plurality of setting items available for the image data, the setting items including independent setting items independent of content of the image data; storing in advance a sample image; and displaying, prior to receipt of the image data, an input screen that displays the independent setting items and the sample image. The creating includes creating a preview image based on setting specified with respect to any of the independent setting items for the sample image. The displaying includes displaying the preview image.

According to still another aspect of the present invention, there is provided a computer program product that implements the above method on a computer.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is an example of contents of an association table in which setting items are associated with positions;

DETAILED DESCRIPTION OF THE PREFERRED EMBODIMENTS

Exemplary embodiments of the present invention are explained in detail below referring to the accompanying drawings.

A first embodiment of the present invention is explained referring to FIGS. 1 to 9. An image processing apparatus of the first embodiment is explained as, for example, a multi-function product (MFP) that combines any or all of such functions as a copier, a facsimile (FAX) machine, a printer, a scanner, and a function of delivering an input image (an original image scanned by the scanner or an image input by the FAX machine).

Figure 1:
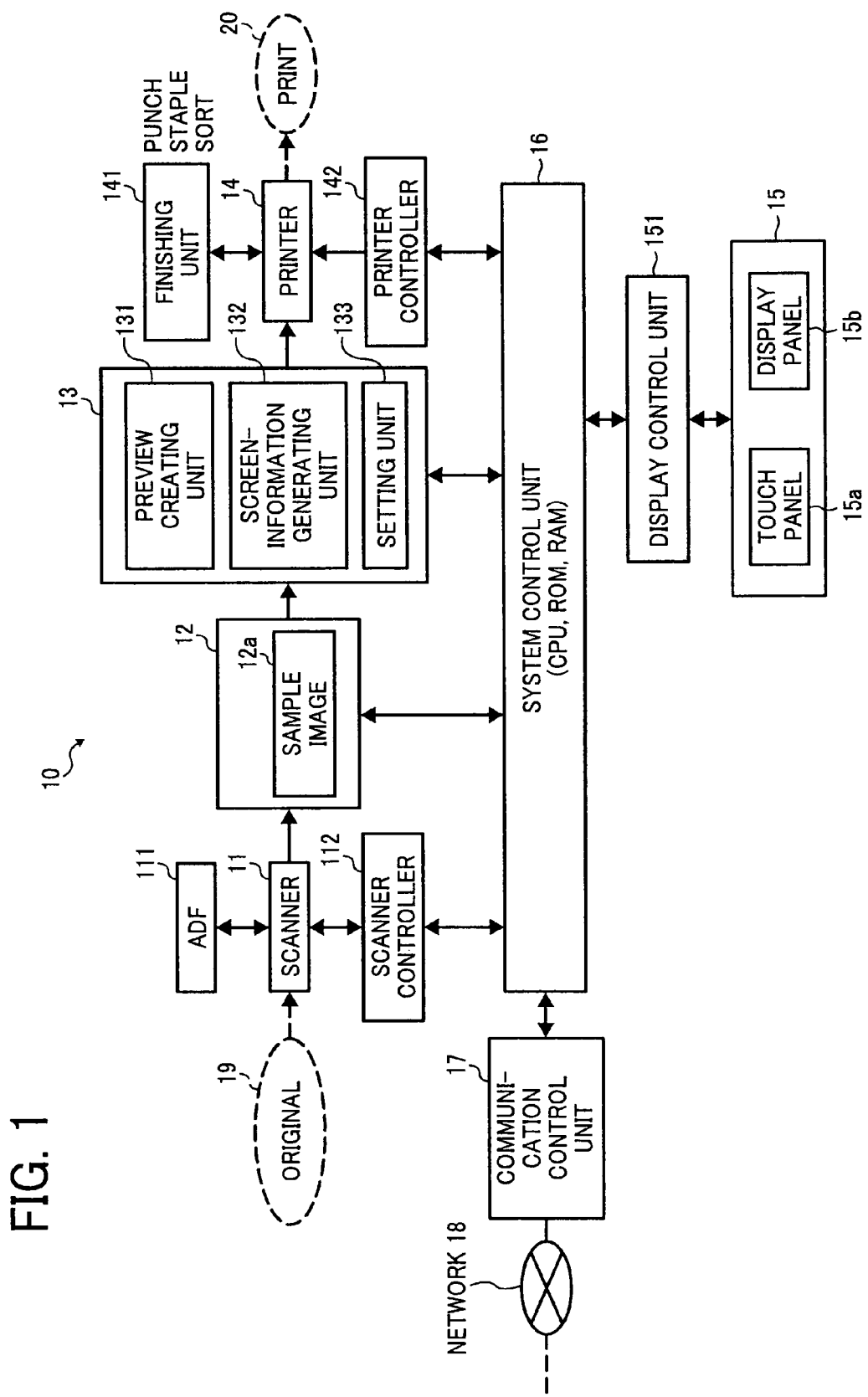
FIG. 1 is a functional block diagram of a multifunction product (MFP) as an image processing apparatus according to a first embodiment of the present invention.

FIG. 1 is a functional block diagram of an MFP 10 according to the first embodiment. The MFP 10 includes a scanner 11, an automatic document feeder (ADF) 111, a scanner controller 112, a storage unit 12, an image processing unit 13, a printer 14, a printer controller 142, a finishing unit 141, a display unit 15, a display control unit 151, a system control unit 16, and a communication control unit 17. The MFP 10 is connected to a network 18 via the communication control unit 17. The MFP 10 scans an image of an original 19, applies image processing to the image, and outputs the image as a print 20.

The system control unit 16 is connected to the respective units and controls the MFP 10. For example, the system control unit 16 provides the scanner 11 with scanning area information appropriate for a selected sheet size. This system control unit 16 includes a central processing unit (CPU), a read only memory (ROM), and a random access memory (RAM). The CPU operates while using a work area of the RAM based on a computer program stored in the ROM, whereby various kinds of processing are performed.

The computer program executed in the MFP 10 can be stored in a computer readable recording medium such as a compact disk-read only memory (CD-ROM), a flexible disk (FD), a compact disk-recordable (CD-R), or a digital versatile disk (DVD) as a file of an installable format or an executable format. In this case, the CPU of the system control unit 16 loads the computer program from the recording medium into a main storage (not shown) to execute it, whereby various functions of the MFP 10 can be realized. The computer program can be stored in a computer connected to the network 18 such as the Internet, and downloaded through the network. The computer program can also be distributed through the network 18.

The communication control unit 17 is connected to the network such as a local area network (LAN) or the Internet and exchanges image data, control data, and the like with other apparatuses connected to the network according to a communication protocol.

The scanner controller 112 receives a command from the system control unit 16 and controls the scanner 11.

The scanner 11 is controlled by the scanner controller 112 and converts an image of the original 19 into digital image data. The ADF 111 sequentially delivers a plurality of pages of originals set thereon to a scanning position of the scanner 11 one by one. Thus, the scanner 11 can automatically and sequentially scan the originals. The ADF 111 can deliver not only an original printed on one side thereof but also an original printed on both sides thereof by reversing the original. Thus, it is possible to cause the scanner 11 to scan the both sides of the original.

The storage unit 12 is a buffer memory that receives a command from the system control unit 16 and temporarily stores therein image data scanned by the scanner 11, image data input from the outside through the network 18, and the like. The MFP 10 can process image data input from the outside through the network 18 as well as image data scanned by the scanner 11 to form an image.

The image processing unit 13 receives a command from the system control unit 16, applies γ correction, modulation transfer function (MTF) correction, and the like to multi-value data sent from the scanner 11 and temporarily stored in the storage unit 12. The image processing unit 13 performs gradation processing such as slicing and dithering on the data, and converts it to digital (multi-value) data. The image processing unit 13 performs various kinds of image processing (reduce/enlarge, adjustment of density and colors, etc.) corresponding to functions set by a user, image-area edit (area erasure, area movement, area reversal, etc.), and layout processing (duplex/simplex printing, image combining, margin adjustment, etc.). Thus, the image processing unit 13 creates a preview image indicating a finished state of an image.

The image processing unit 13 includes a preview creating unit 131, a screen information generating unit 132, and a setting unit 133.

Basically, the preview creating unit 131 creates a preview of the original image (a preview image) based on settings or parameters specified for processing image data obtained by pre-scanning an original image and displayed on a display panel 15b. Namely, the preview creating unit 131 creates a preview image indicating a results of processing an original image. Basically, the preview creating unit 131 uses the multi-value data temporarily stored in the storage unit 12.

The screen information generating unit 132 generates input screen information displayed on the display panel 15b. The input screen information includes various types of setting items for the preview image created by the preview creating unit 131.

When the user provides setting input on an input screen 400 displayed on the display panel 15b through a touch panel 15a, described later, the setting unit 133 receives a signal of the setting input and acquires coordinate information concerning an input image stored in the storage unit 12.

When the setting unit 133 receives a setting-input signal, the preview creating unit 131 updates the preview image according to the setting-input signal. The preview creating unit 131 displays the update preview image.

The screen information generating unit 132 generates, according to the setting-input signal received by the setting unit 133, input screen information for display of a screen for receiving setting input from the user again. The display panel 15b updates and displays the input screen 400 according to the input screen information.

The printer controller 142 receives a command from the system control unit 16 and controls the printer 14.

The printer 14 is an electrophotographic printer and, under the control of the printer controller 142, scans a photosensitive member with light beams based on image data processed by the image processing unit 13, develops an electrostatic image formed on the photosensitive member into a toner image, transfers the toner image onto a transfer sheet, and fixes the toner image thereon. The printer 14 can also be, for example, an inkjet printer, a sublimation dye transfer printer, a silver salt photographic printer, a direct thermal recording printer, and a thermofusible transfer printer.

The printer 14 is mounted with the finishing unit 141. The finishing unit 141 performs finishing, based on automatic setting or setting specified by the user, such as sorting, by a unit of the number of copies or a page, a print 20 obtained by printing, stamping a predetermined stamp on a print medium, aligning a plurality of print media and stapling the print media, and punching punch holes for binding the print media in a binder or a file.

The display control unit 151 receives a command from the system control unit 16 and controls input and output of the display unit 15. For example, the display control unit 151 controls to output data processed by the image processing unit 13 to the touch panel 15a and the display panel 15b. More specifically, the display control unit 151 causes the display panel 15b to display a preview image. The display control unit 151 controls input from the touch panel 15a. The display panel 15b and the touch panel 15a are separately shown in FIG. 1; however, they are explained as being integrated in the following description.

The touch panel 15a detects a position with which a pointer makes an electric or magnetic contact. As pointing means (not shown) for pointing a position on the touch panel 15a, a finger tip, a stylus pen, and other touch input tools (hereinafter, "pointers") can be used. The user inputs various settings or parameters including print setting by touching the touch panel 15a with such a pointer.

In the first embodiment, an example is explained in which input is provided by touching the touch panel 15a. However, input can be provided in other manners. For example, the display unit 15 can include a hard key (physical key) that a user presses to issue a command such as a print command. As the display panel 15b, a dedicated display device included in the MFP 10 can be used.

The display unit 15 displays functions available in the MFP 10 as setting items and receives from the user setting input indicating a setting item selected from the setting items. When a user touches with the pointer a position on the touch panel 15a, a coordinate of the position is detected. When the position is in an area corresponding to an setting item (where the setting item is selectable), the display control unit 151 determines that the setting item is selected. For example, the display unit 15 receives setting of scanning conditions for the scanner 11 corresponding to the state of an original, setting for the image processing unit 13 that performs processing such as image quality adjustment on scanned image data, setting of print conditions for the printer 14, and setting for the finishing unit 141 that applies finishing such as sorting, stapling, and punching to a print after printing.

Upon receiving a setting as described above via the display control unit 151, the system control unit 16 causes the image processing unit 13 to create a preview image by reflecting the setting on the original image data stored in the storage unit 12. The system control unit 16 sends the preview image to the display unit 15 such that the display unit 15 displays the preview image.

Figure 2:
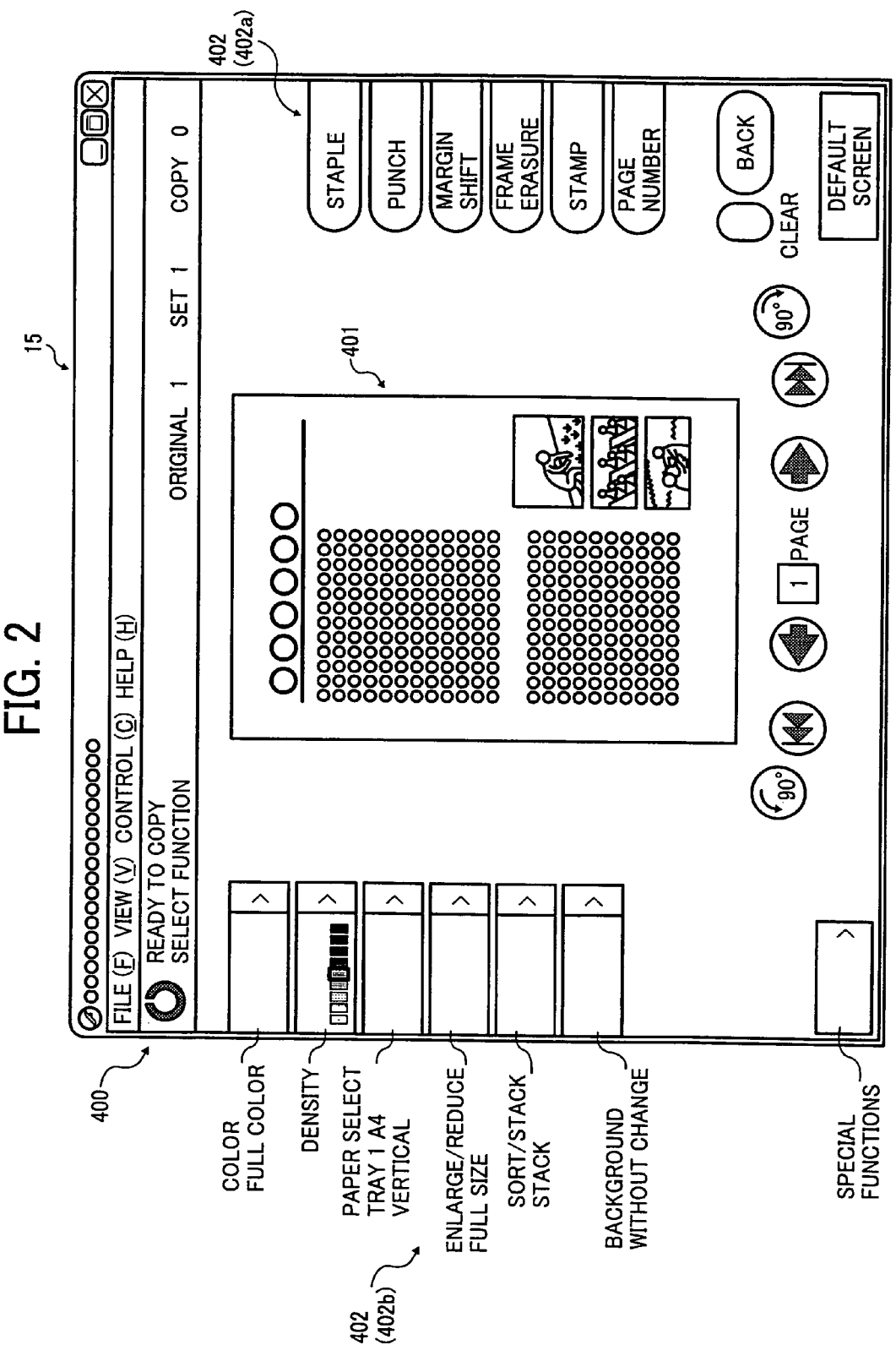
FIG. 2 is a schematic diagram of an example of a preview image created from input image data.

FIG. 2 is an example of a preview image created by the preview creating unit 131 from input image data. A preview image 401 and setting items 402 are displayed on the display panel 15b. As the setting items 402, a menu 402a related to positions or an original direction on the preview image 401 including items such as staple, punch, margin shift, frame erasure, stamp, and page number is displayed on the right side of the screen. On the left side of the screen is displayed menu 402b not related to contents of image data, such as an output color, output density, sheet, reduce/enlarge, simplex/duplex, combination, sort and stack, and background. In other words, the menu 402b includes setting items for functions that can be specified without checking an original image.

When the user touches the touch panel 15a with the pointer while viewing the preview image 401 displayed on the display panel 15b, the touch panel 15a receives input of positional information concerning a spatial position on a print in a finished state displayed as the preview image 401. In such a case, the setting unit 133 analyzes the positional information received through the touch panel 15a and acquires coordinate information on an image with which the pointer comes into contact.

With such a structure, the MFP 10 displays, prior to actual copy printing, the preview image 401 on the display panel 15b. After checking the preview image 401 visually, the user can change the setting, when necessary, for actual printing.

Figure 3:
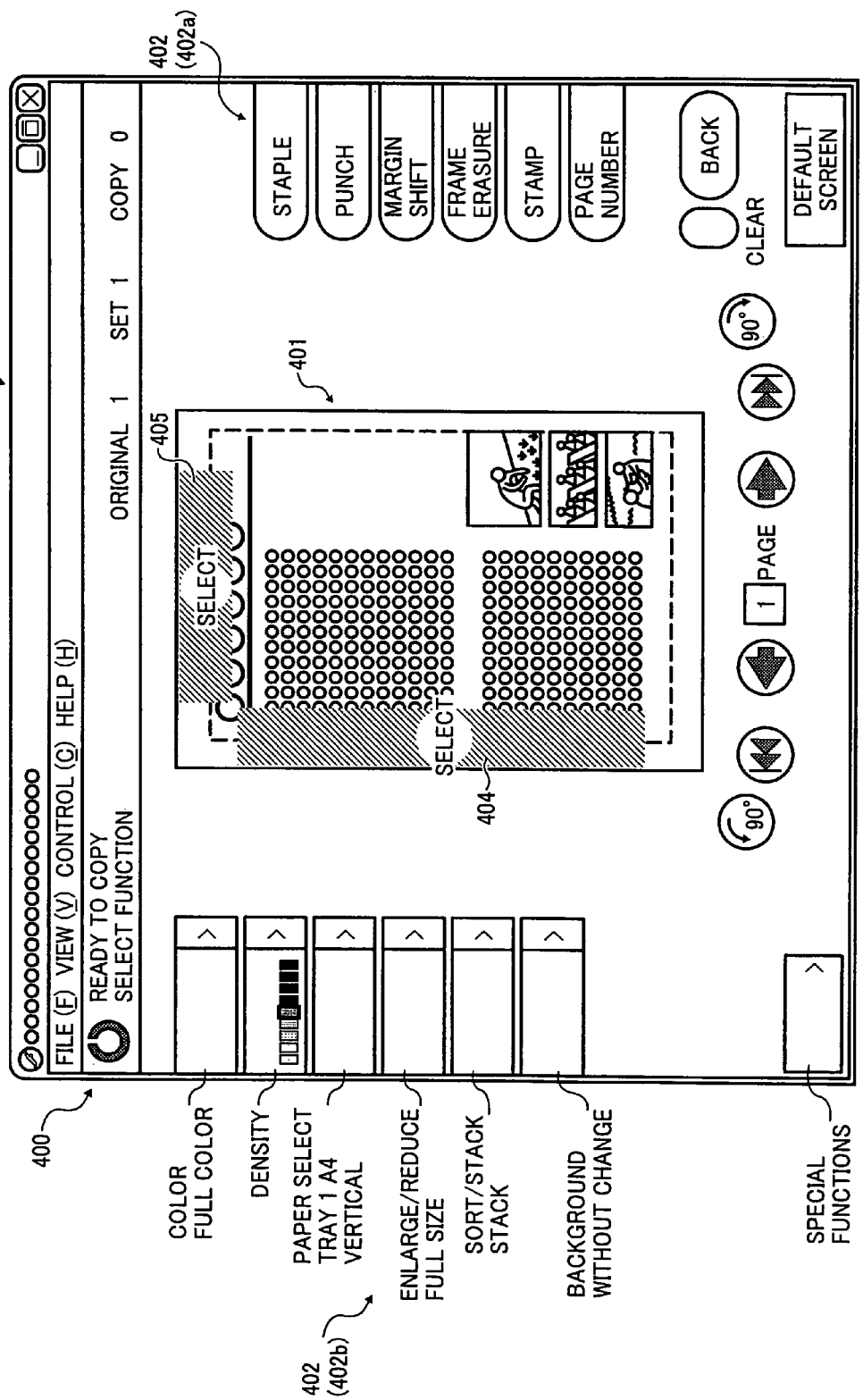
FIG. 3 is a schematic diagram of the preview image in which a setting item is selected.

As shown in FIG. 3, it is assumed that punch 403 is selected from the setting items 402 (the menu 402a) displayed on the display unit 15 by touch input from the user.

When the display unit 15 detects a touch on the punch 403 displayed thereon, the system control unit 16 receives setting of the punch 403 via the display control unit 151. The screen information generating unit 132 reads out an area corresponding to the punch 403 from an association table. In the association table, as shown in FIG. 4, each function of the setting items 402 is associated with an area or a position where the function is applicable. The screen information generating unit 132 displays areas 404 and 405 where the punch 403 can be applied on the display unit 15. The areas 404 and 405 where punch holes can be opened can be displayed in the preview image 401 in an overlapping form or an overwrite form. The areas 404 and 405 can also be displayed with a different color, as being blinking, or with other areas darkening out.

Figure 5:
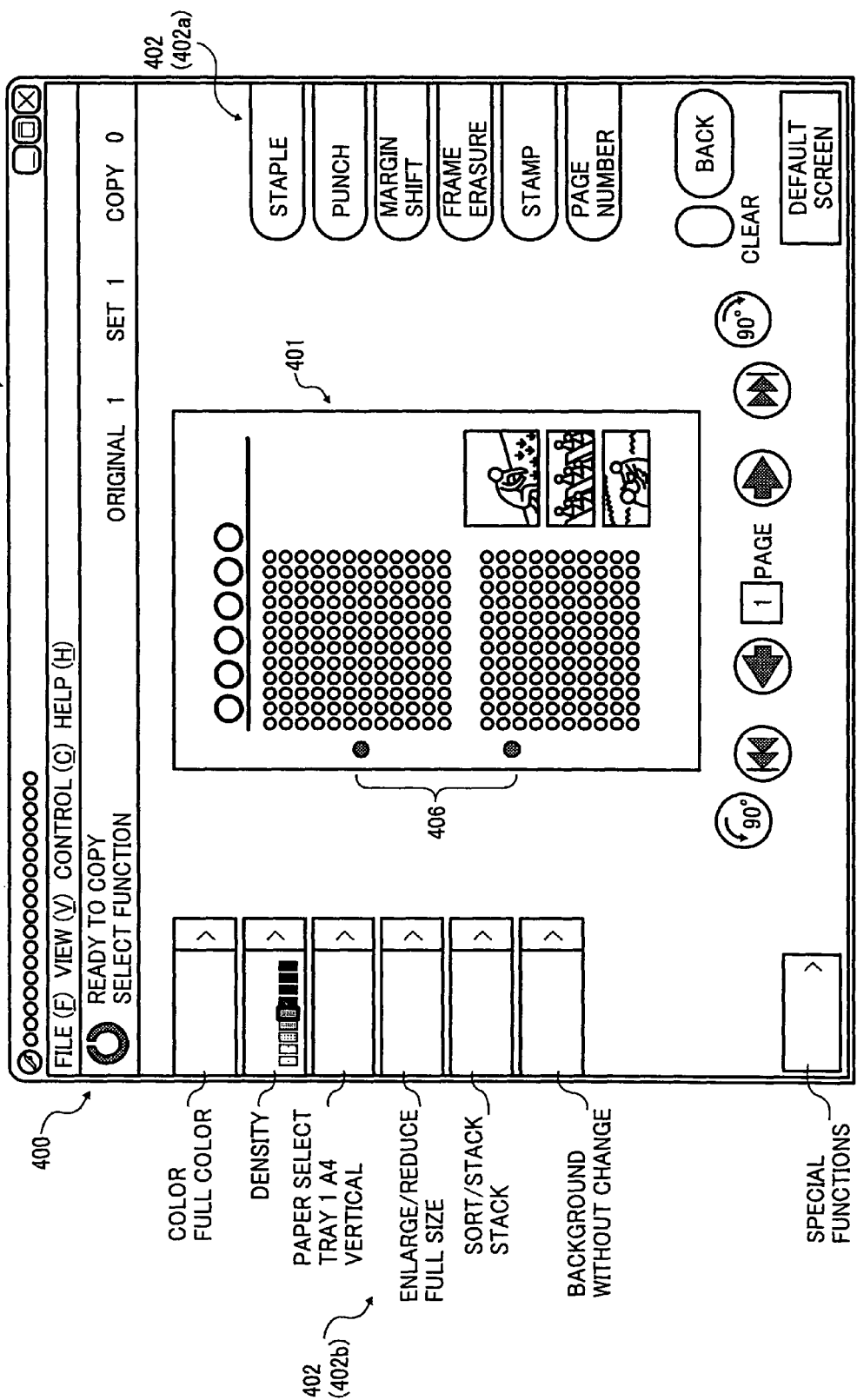
FIG. 5 is a schematic diagram of the preview image subjected to punching.

The user provides touch input by touching the punch hole area 404 shown in FIG. 3. The display unit 15 receives the touch input on the punch 403. The preview creating unit 131 creates a preview image by reflecting the setting for applying punching in the area, sends the preview image to the display unit 15. Accordingly, the display unit 15 displays the preview image. The preview image 401 subjected to punching 406 is shown in FIG. 5. Setting input such as correction is received through the preview image 401 displayed in this way. The setting is reflected and displayed again. When there is no setting input, printing is performed.

Although not shown, when the user touches a specific position on the preview image, a menu of functions related to the position can be displayed, such that when a user selects one of the functions, the function can be immediately reflected in the preview image.

Incidentally, to print an image after a user checks a preview image reflecting function settings specified by the user through preview display, it has been required to pre-scan an original to obtain image data prior to printing.

Specifically, when the user desires to use only content-independent functions as to, for example, output color, output density, sheet, enlarge/reduce, sort/stack, and background, function settings can be specified without pre-scanning of an original to obtain image data. However, it has been required to scan an original before function settings are specified.

Therefore, in the first embodiment, a sample image is displayed on the display panel 15b instead of an original image and function settings are specified on this sample image before an original is scanned, i.e., prior to pre-scanning of the original. That is, function settings can be specified on the display unit 15 without using, for example, an original image actually scanned by the scanner 11.

Specifically, as shown in FIG. 1, sample image data 12a is stored in the storage unit 12 in advance. After the MFP 1 is started, as shown in FIG. 6, a sample image 500 and setting items 402 are displayed on the display panel 15b.

Figure 6:
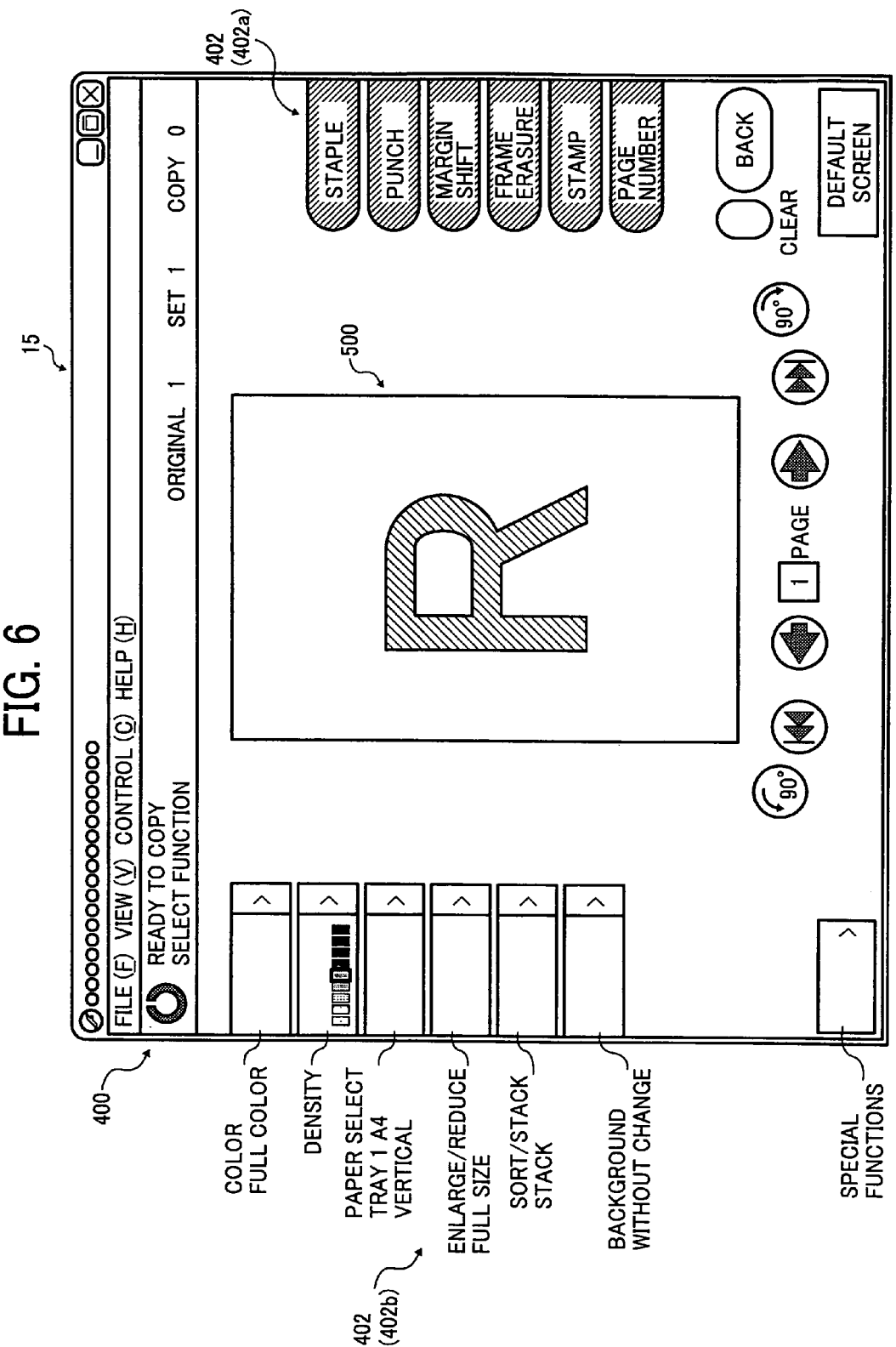
FIG. 6 is a schematic diagram of an example of a sample image displayed instead of a scanned image.

When the sample image 500 is displayed as shown in FIG. 6, the menu 402a, among the setting items 402, dependent on an original direction as well as an area or a position on the preview image 401 such as staple, punch, margin shift, frame erasure, stamp, and page number, which are displayed on the right side of the screen, is displayed in a grayed-out manner to indicate that items of the menu 402a are not available. This is because function settings cannot be specified through the menu 402a without an original image actually scanned by the scanner 11.

The sample image data 12a stored in the storage unit 12 can be freely customized according to preference, needs, and the like of a user. For example, when a user frequently uses originals in landscape format or originals including pictures and photographs, the sample image data 12a matching such originals facilitates checking by the user. Therefore, in the first embodiment, image data on a PC acquired through the network 18 and image data scanned by the scanner 11 can be stored in the storage unit 12 as the sample image data 12a.

Figure 7:
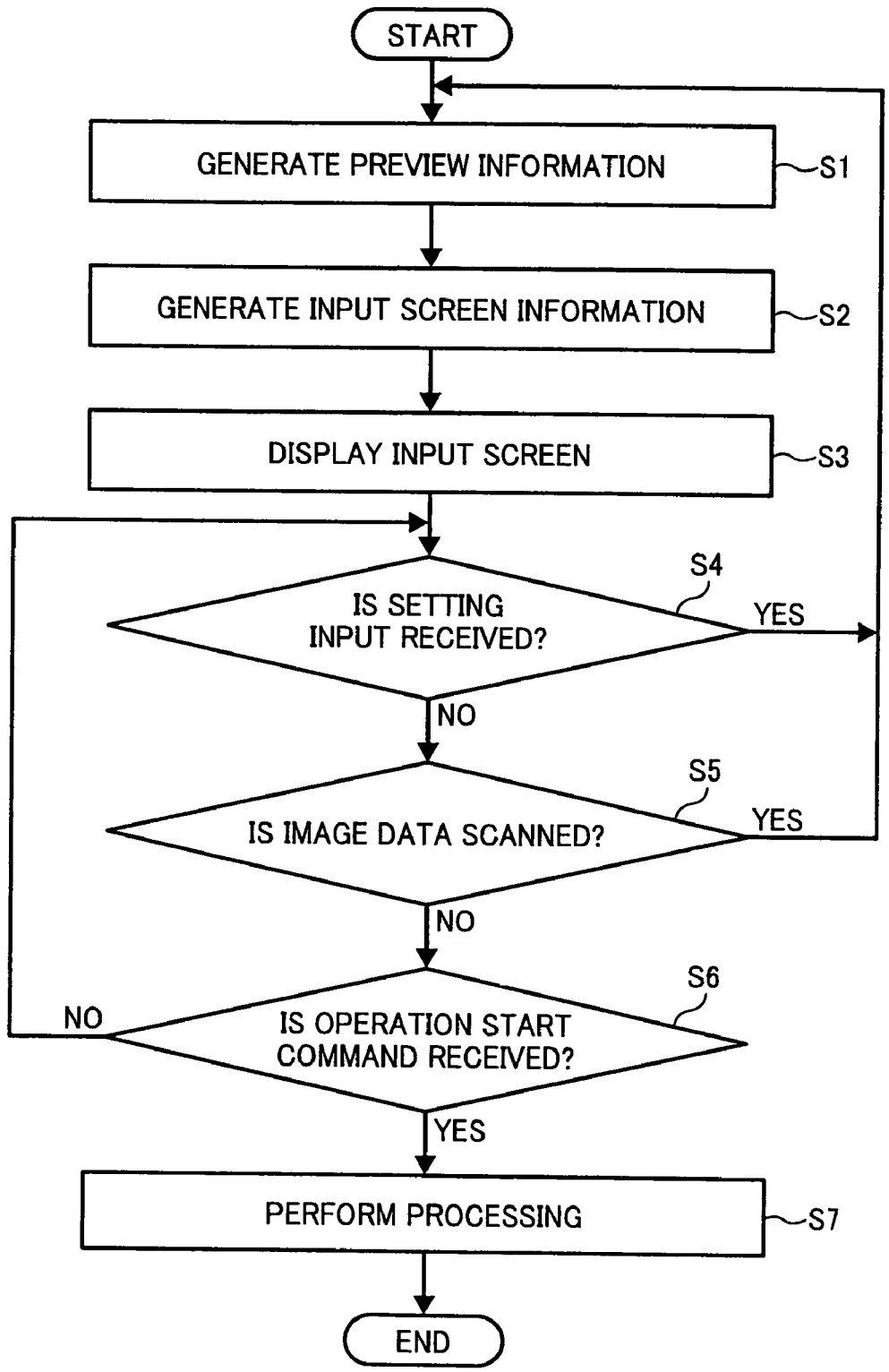
FIG. 7 is a flowchart of a processing procedure from function setting to printing.

FIG. 7 is a flowchart of a processing procedure from function setting to printing performed under control of the system control unit 16. As shown in FIG. 7, upon the MFP 10 starts operation, before an original is scanned, i.e., prior to pre-scanning of the original, the preview creating unit 131 generates, based on default settings (default parameter values), preview information representing a result of finishing applied to the sample image data 12a (step S1). The screen information generating unit 132 generates, based on default settings, input screen information for receiving setting input from the user (step S2). Information concerning the default settings can be stored in the system control unit 16.

The display panel 15b displays, according to the preview information generated by the preview creating unit 131 and the input screen information generated by the screen information generating unit 132, an input screen 400 as shown in FIG. 6 for receiving setting input (step S3).

The user inputs, when necessary, setting information through the menu 402b independent of contents of the input screen 400 and the sample image 500. The setting unit 133 detects whether setting information is input by the user via the touch panel 15a (step S4). When setting information is received (Yes at step S4), the preview creating unit 131 generates again, based on the setting information, preview information representing a result of finishing applied to the sample image data 12a (step S1). The 132 generates again, based on the setting information, input screen information for receiving setting input from the user (step S2). When the menu contents are changed by the user, the screen information generating unit 132 generates input screen information for displaying a new input screen including the changed contents. The display panel 15b displays again, based on the preview information generated by the preview creating unit 131 and the input screen information generated by the screen information generating unit 132, the input screen 400 for receiving setting input (step S3).

Concerning functions that can be set from the menu 402b independent of contents but is not suitable to be applied to the sample image 500 (e.g., output density adjustment and output color adjustment), the process at step S1 for reflecting setting of the functions in the sample image data 12a can be omitted. Thus, it is possible to reduce internal processing when system processing capability is low.

Figure 8:
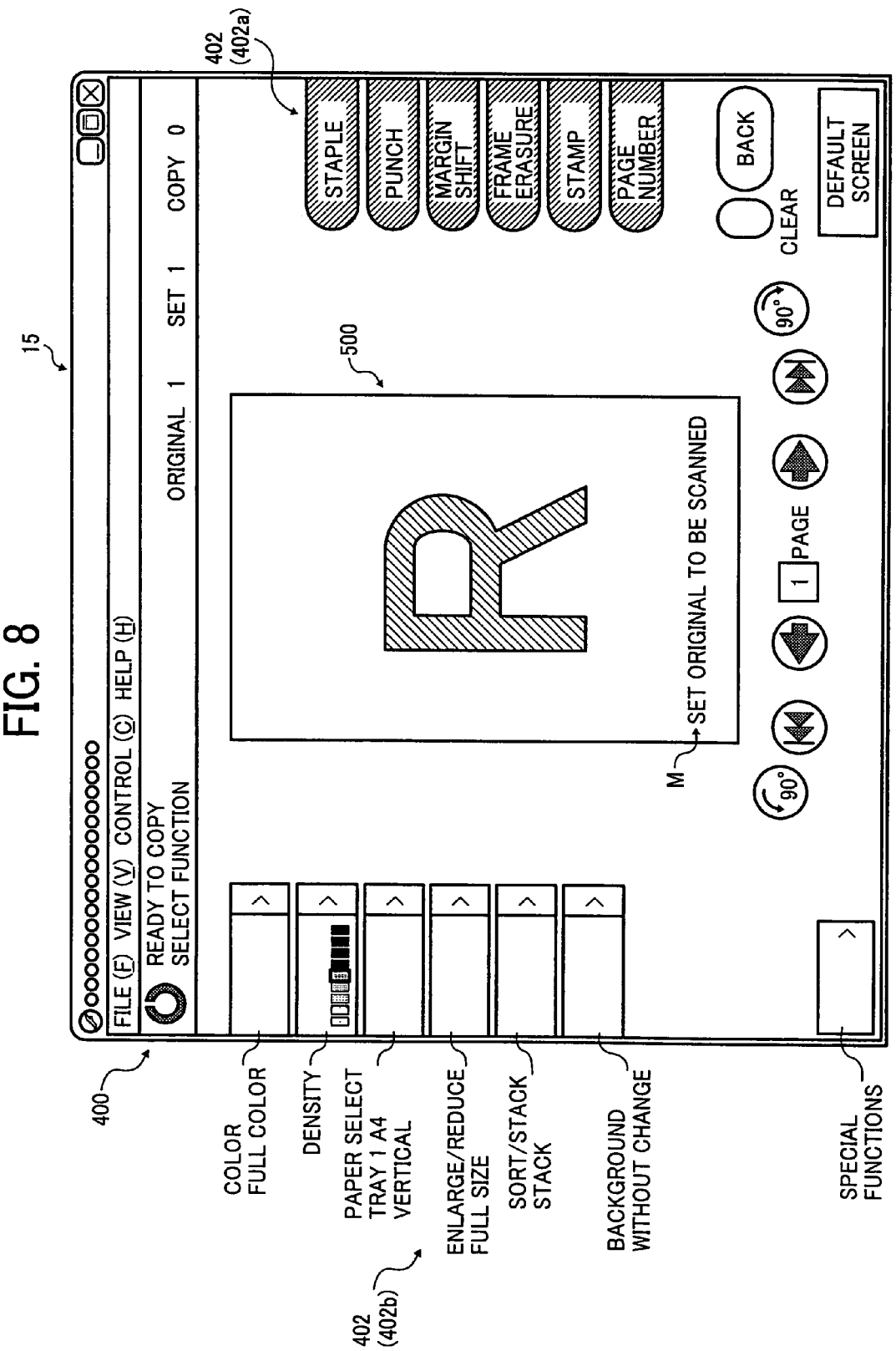
FIG. 8 is a schematic diagram of the sample image on which a message is displayed.

When setting information is input from the menu 402a dependent on an original direction and position displayed in a grayed-out manner (Yes at step S4), as shown in FIG. 8, the preview creating unit 131 overlay-displays on the sample image 500 a message M "Set an original to be scanned" to notify the user that the original needs to be scanned to set the function specified by the setting information. Specifically, for example, a message-display area where the message M is to be overwritten is specified upon preparation of the sample image data 12a or a plain background area is automatically detected as the message-display area, so that the message M can be overlay-displayed in the message-display area. Because the user pays attention to the sample image 500 (preview image), it is preferable that the message M be displayed in the message-display area provided in the sample image 500 as shown in FIG. 8. Although it is effective to display on the sample image 500 a message that needs to be conveyed to the user without fail, an area exclusively used for displaying a message can be provided in, for example, an upper part of a screen.

Examples of messages displayed on the sample image 500 include, other than feedback from the system, a message from a system administrator to the user. For example, the sample image 500 can be used like a message board for the user of the MFP 10 by displaying a message registered in advance (e.g., " . . . size sheets are on order and should be delivered by . . . ") in the message-display area.

When image data is scanned after completion of function setting (Yes at step S5), the preview creating unit 131 generates again, based on the setting information for the sample image data 12a, preview information representing a result of finishing applied to the scanned image data (step S1). The screen information generating unit 132 generates again, based on the setting information, input screen information for receiving setting input from the user (step S2). When the menu contents are changed by the user, the screen information generating unit 132 generates input screen information for displaying a new input screen including the changed contents. The display panel 15b displays again, based on the preview information generated by the preview creating unit 131 and the input screen information generated by the screen information generating unit 132, the input screen 400 for receiving setting input (step S3).

The display unit 15 is in a state capable of detecting a print command issued by, for example, depression of a button. When a print command is received (Yes at step S6), the display unit 15 prints the scanned image data based on the sample image 500 or preview information generated based on the setting information input for the scanned image data (step S7).

As described above, according to the first embodiment, prior to input of image data, input screen information is displayed that includes setting items independent of contents from among setting items that can be set with respect to the image data and sample image data stored in advance. As a preview image is displayed a sample image reflecting setting input received for the setting items independent of contents. Thus, the need for pre-scanning of an original can be eliminated, which increases the speed of setting various items.

Moreover, it is possible to scan an original at arbitrary timing as required during the setting process so that a user can specify complicated and detailed settings while viewing preview of the scanned original. Even before scanning of the original, simple settings can be specified.

Figure 9:
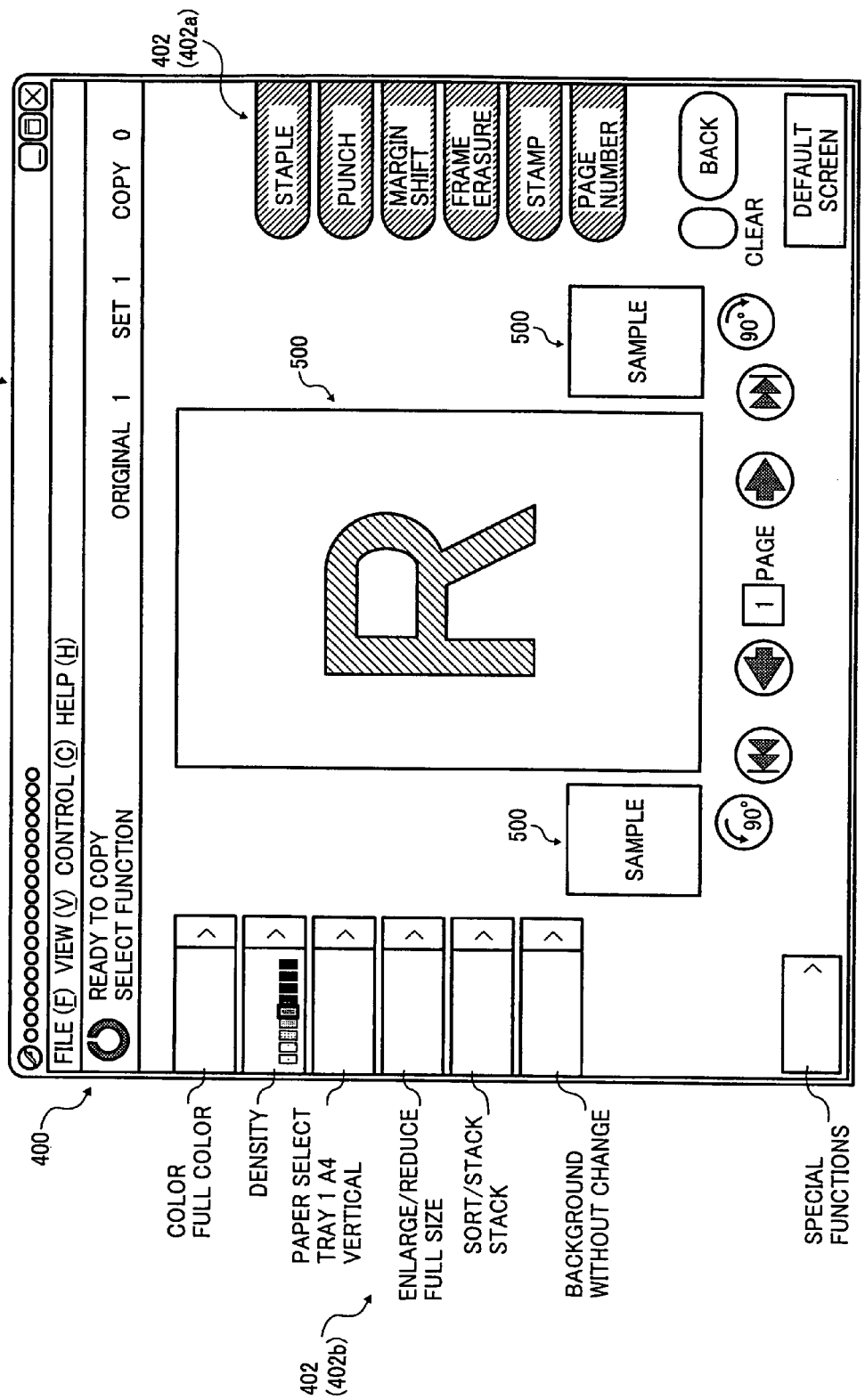
FIG. 9 is a schematic diagram of an example of sample images displayed instead of a scanned image.

A case is explained above where the one sample image 500 is displayed as shown in FIG. 6. However, it is possible to, for example, store a plurality of sets of sample image data in the storage unit 12, and display a plurality of sample images 500 as shown in FIG. 9, so that the user can select a desired sample image. In FIG. 9, the sample image 500 displayed largest among the sample images 500 is an object for providing setting input. The sample images 500 are scrolled with an animation effect by operation of page up and down buttons 600.

In the first embodiment, the MFP 10 is explained as an example of the image processing apparatus. However, the same function as the image processing apparatus described above can be implemented by a combination of an image forming apparatus such as a printer and a computer installed with a predetermined computer program. In this case, the printer is connected to the computer, and a central processing unit (CPU) of the computer reads the computer program from a storage device, such as a hard disk (HD), and executes the computer program.

Figure 10:
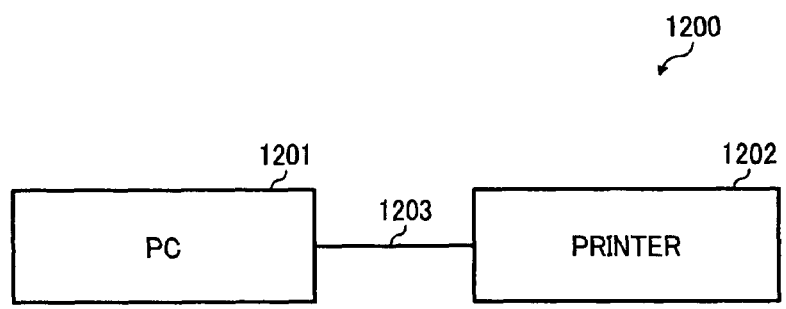
FIG. 10 is a block diagram of a print system according to a second embodiment of the present invention.

FIG. 10 is a block diagram of a print system 1200 according to a second embodiment of the present invention. The print system 1200 includes a personal computer (PC) 1201 that issues a print job including print data, and a printer 1202 that prints the print data. The PC 1201 and the printer 1202 are connected via a cable 1203.

The PC 1201 sends print data corresponding to a created document and print conditions set for printing the print data to the printer 1202 as a print job. Examples of the print conditions include sheet direction, combination (2 in 1, 4 in 1, etc.), bookbinding, staple, punch, and reduce/enlarge.

The printer 1202 prints the print data according to the print job received from the PC 1201. Specifically, the printer 1202 prints the print data included in the print job on a medium such as paper according to the print conditions included in the print job.

Figure 11:
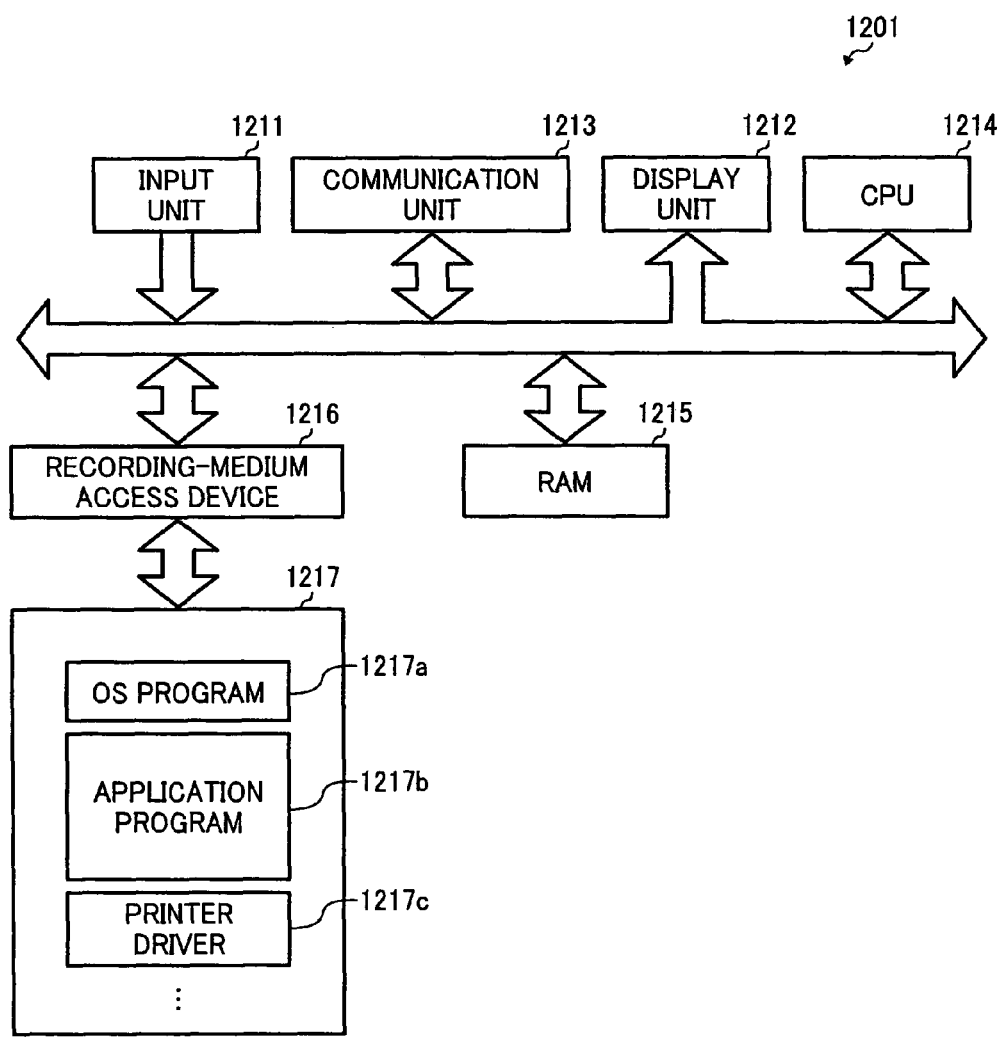
FIG. 11 is a block diagram of a personal computer shown in FIG. 10.

FIG. 11 is a block diagram of the PC 1201. The PC 1201 includes an input unit 1211 for inputting data, a display unit 1212, a communication unit 1213 for data communication, a CPU 1214 that controls the apparatus, a RAM 1215 used as a work area of the CPU 1214, a recording-medium access device 1216 that reads data from and writes data to a recording medium 1217. The recording medium 1217 stores therein various computer programs and the like for the CPU 1214.

The input unit 1211 includes a keyboard with cursor keys, number keys, and various function keys, a mouse, and a slice pat for selecting a key and the like on a display screen. The input unit 1211 is an interface with which the user gives an instruction to the CPU 1214 and inputs data.

The display unit 1212 includes a cathode ray tube (CRT), a liquid crystal display (LCD), or the like. On the display unit 1212, display data from the CPU 1214 is displayed. Through the communication unit 1213, data is communicated with, for example, the printer 1202 via the cable 1203.

The CPU 1214 controls the apparatus according to the computer programs stored in the recording medium 1217. The input unit 1211, the display unit 1212, the communication unit 1213, the RAM 1215, and the recording-medium access device 1216 are connected to the CPU 1214. The CPU 1214 controls data communication, readout of an application program and read and write of various data through access to a memory, data and command input, display, and the like. The CPU 1214 sends print data and print conditions of the print data input from the input unit 1211 to the printer 1202 via the communication unit 1213 as a print job.

The RAM 1215 includes a work memory that stores therein designated computer programs, input instruction, input data, processing result, etc., and a display memory that temporarily stores therein display data to be displayed on the display unit 1212.

The recording medium 1217 stores therein various computer programs such as an OS program 1217a (e.g., WINDOWS (registered trademark)) executable by the CPU 1214, an application program 1217b for document creation, and a printer driver 1217c corresponding to the printer 1202. The recording medium 1217 is, for example, an optical, magnetic, or electric recording medium such as a flexible disk, a hard disk, a CD-ROM, a DVD-ROM, an MO, or a PC card. The computer programs are stored in the recording medium 1217 in a data format readable by the CPU 1214. The computer programs can be recorded in a recording medium in advance or downloaded via a communication line into a recording medium. The computer programs can also be distributed through a communication line.

Figure 12:
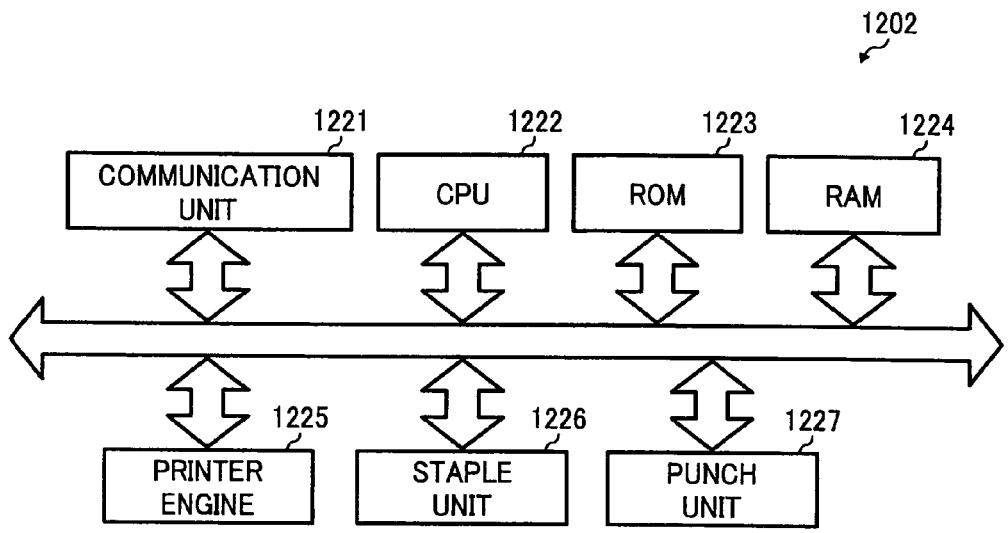
FIG. 12 is a block diagram of a printer shown in FIG. 10.

FIG. 12 is a block diagram of the printer 1202. The printer 1202 includes a communication unit 1221 for data communication, a CPU 1222 that controls the printer 1202, a ROM 1223, a RAM 1224, a printer engine 1225, a staple unit 1226, and a punch unit 1227.

Figure 13:
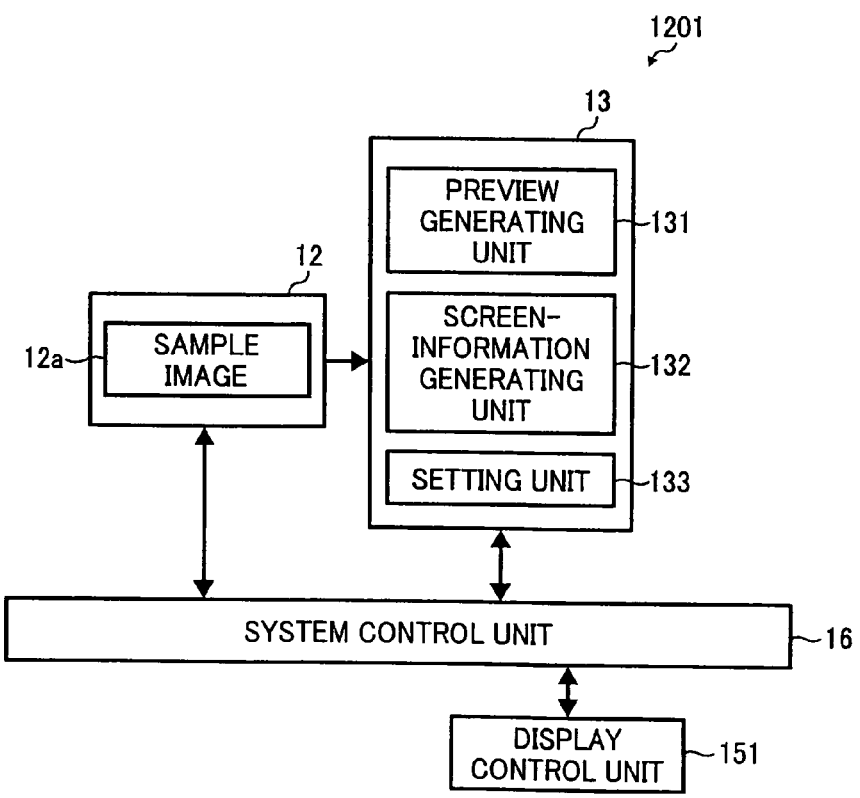
FIG. 13 is a block diagram of relevant part of the personal computer.

The ROM 1223 stores therein various control programs for the CPU 1222. The RAM 1224 is a work area for the control programs and temporarily stores therein print data and print conditions of a print job input from the PC 1201 as shown in FIG. 13 or the like. The printer engine 1225 performs printing the print data on a transfer sheet. The staple unit 1226 staples sheets on which the print data is printed. The punch unit 1227 opens punch holes in the transfer sheet on which the print data is printed. In other words, the printer 1202 has a duplex printing function, a punch function, a staple function, and the like.

The communication unit 1221 is a unit for performing data communication with the outside. For example, through the communication unit 1221, data is communicated with the PC 1201.

The CPU 1222 controls the apparatus according to various control programs stored in the ROM 1223. The communication unit 1221, the ROM 1223, the RAM 1224, the printer engine 1225, the staple unit 1226, and the punch unit 1227 are connected to the CPU 1222. The CPU 1222 controls data communication, a printer operation, and the like.

The ROM 1223 stores therein various control programs for the CPU 1222 and parameters, etc. used for processing by the CPU 1222. The RAM 1224 includes a work memory that stores therein a designated control program, a processing result, received print data, and the like.

The printer engine 1225 is of an electrophotographic type and prints print data on a transfer sheet. The printer 1202 can employ, besides electrophotographic printing, inkjet printing, sublimation dye transfer printing, silver salt photographic printing, direct thermosensitive recording, and thermofusible transfer printing.

The printer driver 1217c is a software program that can be run without being hindered by other computer programs, hardware of the printer 1202, and a language used in the PC 1201. The printer driver 1217c is used for controlling the printer 1202 and processing output data and the like.

The CPU 1214 creates and displays, according to the printer driver 1217c, a preview image based on print data and print conditions of the print data input from the input unit 1211. The CPU 1214 transfers print data created by the application program 1217b to the printer 1202.

The PC 1201 includes the storage unit 12 that stores therein the sample image data 12a in advance, the image processing unit 13, the display control unit 151, and the system control unit 16. These units are implemented by the CPU 1214 operating according to the printer driver 1217c.

In this way, with the CPU 1214 executing the printer driver 1217c, the PC 1201 realizes the same function as the MFP 10 shown in FIG. 1. Thus, it is possible to obtain the same effects as previously explained in the first embodiment.

Figure 14:
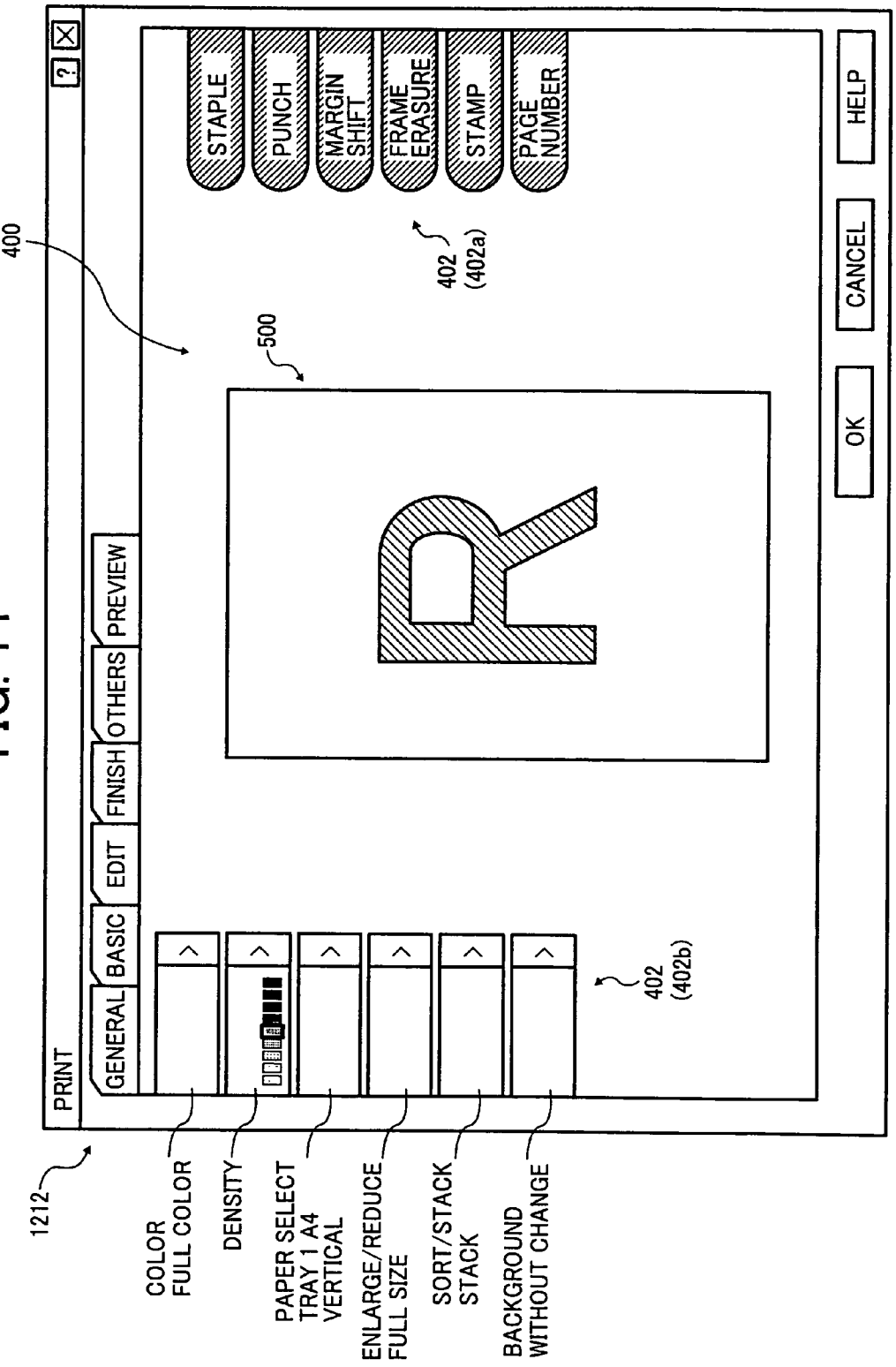
FIG. 14 is an example of a screen displayed by a printer driver.

FIG. 14 is an example of a display screen displayed by the printer driver 1217c. The screen shown in FIG. 14 is, for example, a display screen for the application program 1217b or a screen for starting the OS program 1217a. The screen is displayed before an original is scanned, i.e., prior to pre-scanning of the original after the start of the printer driver 1217c is selected. On the screen shown in FIG. 14, it is possible to select, in addition to setting screens such as a basic-condition setting screen, an edit-condition setting screen, and a finish-condition setting screen, the input screen 400 on which the sample image 500 for generating and displaying a preview image is displayed based on the sample image data 12a stored in the storage unit 12.

In the second embodiment, the CPU 1214 operates according to the printer driver 1217c to display the input screen 400 on which the sample image 500 for creating and displaying a preview image is displayed based on the sample image data 12a stored in the storage unit 12. However, the CPU 1214 can operate according to the application program 1217b or the OS program 1217a to display the input screen 400 on which the sample image 500 is displayed.

As set forth hereinabove, according to an embodiment of the present invention, the need for pre-scanning of an original can be eliminated. Thus, setting of various items can be facilitated and performed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
a storage unit that stores therein first image data for generating a first preview image;
a setting value receiving unit that receives a setting value for outputting target image data;
a first displaying unit that displays the first preview image generated based on the first image data and the setting value, wherein the first preview image is capable of being displayed before receiving the target image data for output at the image processing apparatus;
an image input unit that receives second image data as the target image data; and
a second displaying unit that displays a second preview image generated based on the second image data and a setting value;
wherein when the first preview image is displayed by the first displaying unit, the first preview image is generated based on the first image data and only a setting value of a first setting item, the first setting item being one of a plurality of setting items; and
when the second preview image is displayed by the second displaying unit, the second displaying unit displays the second preview image generated based on the second image data and a setting value of the first setting item and a second setting item, the second setting item being different from the first setting item, and the second setting item being one of the plurality of setting items.

2. The image processing apparatus according to claim 1, wherein the first setting item includes at least one item selected from items that include output color, output density, sheet, enlarge/reduce, simplex/duplex, combination, sort/stack, and background, and the second setting item includes at least one item selected from items that include staple, punch, margin shift, frame erasure, stamp, and page number.

3. The image processing apparatus according to claim 2, wherein a first control unit includes a specifying unit that specifies a display area of a message superimposed on the first preview image, and the first control unit displays the first preview image that has the specified display area with the message superimposed thereon, on the displaying unit, when a prescribed condition is met.

4. The image processing apparatus according to claim 3, wherein the prescribed condition is that an input to select the second setting item displayed on the displaying unit is detected, and the message superimposed on the first preview image is a message notifying the user that the item requested is not available.

5. The image processing apparatus according to claim 1, wherein the setting value receiving unit receives the setting value of the first setting item and does not receive the setting value of the second setting item before receiving the target image data for output at the image processing apparatus.

6. The image processing apparatus according to claim 1, wherein the first image data is treated as sample data and not as the target image data.

7. A non-transitory computer usable medium encoded with computer readable program codes that, when executed, cause a computer to execute:
storing, in a storage unit, first image data for generating a first preview image;
providing a setting value receiving unit that receives a setting value for outputting target image data;
providing a first displaying unit that displays the first preview image generated based on the first image data and the setting value, wherein the first preview image is capable of being displayed before receiving the target image data for output at the image processing apparatus;
causing an image input unit to receive second image data as the target image data; and
causing a second displaying unit to display a second preview image generated based on the second image data and a setting value;
wherein when the first preview image is displayed by the first displaying unit, the first preview image is generated based on the first image data and only a setting value of a first setting item, the first setting item being one of a plurality of setting items; and
when the second preview image is displayed by the second displaying unit, the second displaying unit displays the second preview image generated based on the second image data and a setting value of the first setting item and a second setting item, the second setting item being different from the first setting item, and the second setting item being one of the plurality of setting items.

8. The medium according to claim 7, wherein the first setting item includes at least one item selected from items that include output color, output density, sheet, enlarge/reduce, simplex/duplex, combination, sort/stack, and background, and the second setting item includes at least one item selected from items that include staple, punch, margin shift, frame erasure, stamp, and page number.

9. The medium according to claim 8, wherein a first control unit includes a specifying unit that specifies a display area of a message superimposed on the first preview image, and the first control unit displays the first preview image that has the specified display area with the message superimposed thereon, on the displaying unit, when a prescribed condition is met.

10. The medium according to claim 9, wherein the prescribed condition is that an input to select the second setting item displayed on the displaying unit is detected, and the message superimposed on the first preview image is a message notifying the user that the item requested is not available.

11. The medium according to claim 7, wherein a second creating unit executes processing to create an update of the first preview image, when a first receiving unit receives a certain setting on the first setting item, and does not execute processing to create the update of the first preview image, when the first receiving unit receives a setting other than the certain setting.

12. The medium of claim 7, wherein the setting value receiving unit receives the setting value of the first setting item and does not receive the setting value of the second setting item before receiving the target image data for output at the image processing apparatus.

13. The medium of claim 7, wherein the first image data is treated as sample data and not as the target image data.

14. A preview image displaying method comprising:
storing, in a storage unit, first image data for generating a first preview image;
providing a setting value receiving unit that receives a setting value for outputting target image data;
providing a first displaying unit that displays the first preview image generated based on the first image data and the setting value, wherein the first preview image is capable of being displayed before receiving the target image data for output at the image processing apparatus;
causing an image input unit to receive second image data as the target image data; and
causing a second displaying unit to display a second preview image generated based on the second image data and a setting value;
wherein when the first preview image is displayed by the first displaying unit, the first preview image is generated based on the first image data and only a setting value of a first setting item, the first setting item being one of a plurality of setting items; and
when the second preview image is displayed by the second displaying unit, the second displaying unit displays the second preview image generated based on the second image data and a setting value of the first setting item and a second setting item, the second setting item being different from the first setting item, and the second setting item being one of the plurality of setting items.

15. The method according to claim 14, wherein the first setting item includes at least one item selected from items that include output color, output density, sheet, enlarge/reduce, simplex/duplex, combination, sort/stack, and background, and the second setting item includes at least one item selected from items that include staple, punch, margin shift, frame erasure, stamp, and page number.

16. The method according to claim 15, wherein a first control unit includes a specifying unit that specifies a display area of a message superimposed on the first preview image, and the first control unit displays the first preview image that has the specified display area with the message superimposed thereon, on the displaying unit, when a prescribed condition is met.

17. The method according to claim 16, wherein the prescribed condition is that an input to select the second setting item displayed on the displaying unit is detected, and the message superimposed on the first preview image is a message notifying the user that the item requested is not available.

18. The method according to claim 14, wherein a second creating unit executes processing to create an update of the first preview image, when a first receiving unit receives a certain setting on the first setting item, and does not execute processing to create the update of the first preview image, when the first receiving unit receives a setting other than the certain setting.

19. The method of claim 14, wherein the setting value receiving unit receives the setting value of the first setting item and does not receive the setting value of the second setting item before receiving the target image data for output at the image processing apparatus.

20. The method of claim 14, wherein the first image data is treated as sample data and not as the target image data.

* * * * *